Nov. 19, 1940.    M. A. STREHLEIN    2,221,821
FASTENER
Filed June 17, 1937
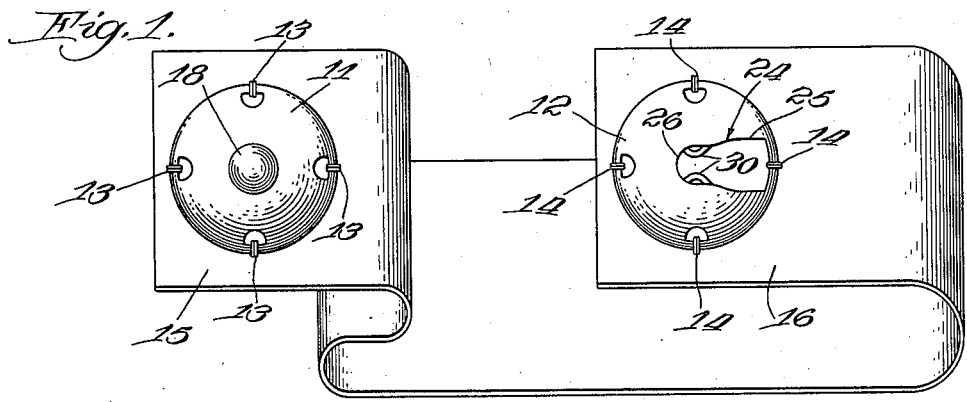
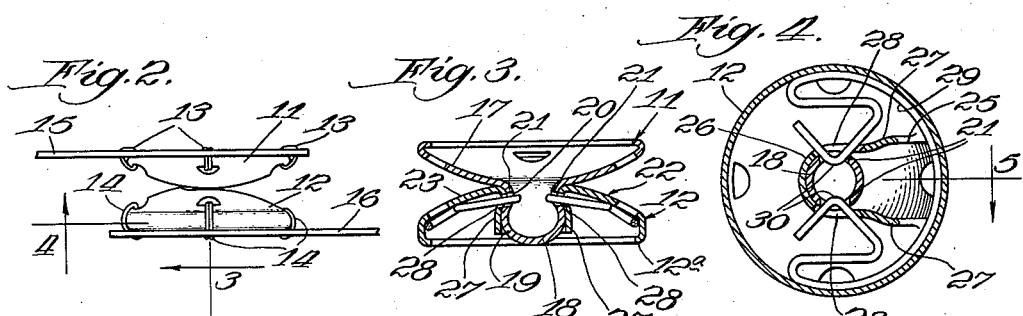
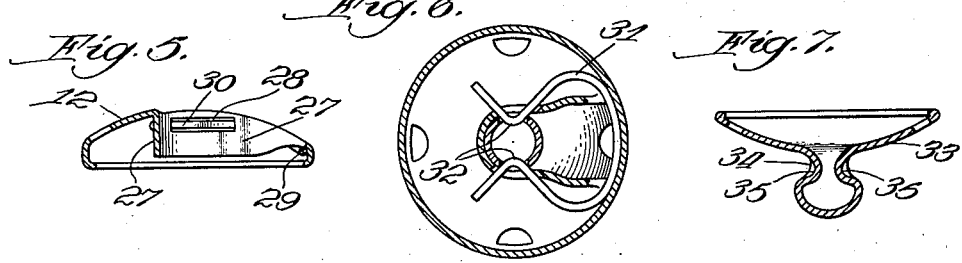
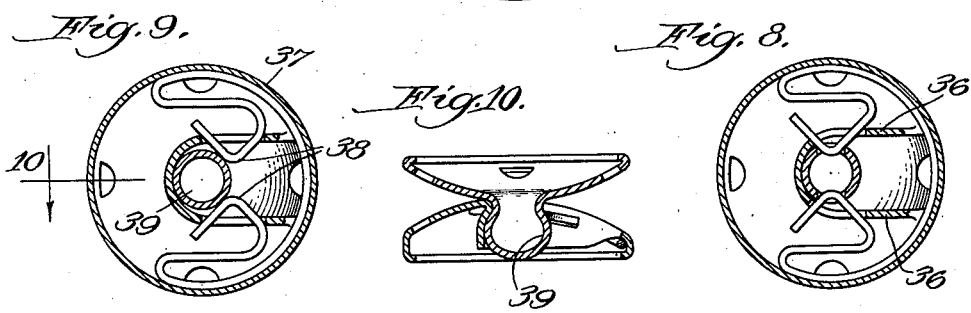
Inventor:
Mary A. Strehlein.
By Chritton, Wiles, Davis, Hirsch & Dawson
Attys.

Patented Nov. 19, 1940

2,221,821

UNITED STATES PATENT OFFICE 2,221,821

FASTENER

Mary A. Strehlein, Chicago, Ill.

Application June 17, 1937, Serial No. 148,768

2 Claims. (Cl. 24—224)

My invention relates to fasteners more particularly, though not exclusively, for garments to detachably secure together two portions thereof, as is common in the case of the use of ball and socket fasteners or hooks and eyes.

My object is to provide a novel, simple, economical and durable construction of fastener which may be easily manipulated to fastened and unfastened condition and not be liable to accidental disengagement, and by the use of which danger of tearing the article equipped therewith, even when of sheer or fragile material, will be avoided; and other objects as will be manifest from the following description.

Referring to the accompanying drawing:

Figure 1 is a perspective view of a band the ends of which are to be releasably secured together, showing these ends as equipped with cooperating parts forming a fastener embodying my invention, the parts of the fastener being shown in disengaged condition.

Figure 2 is a broken edge view of the structure shown in Fig. 1, the parts of the fastener being assembled into interlocked relation.

Figure 3 is an enlarged sectional view through the parts of the fastener, the section being taken at the line 3 on Fig. 2 and viewed in the direction of the arrow.

Figure 4 is an enlarged sectional view taken at the line 4 on Fig. 2 and viewed in the direction of the arrow.

Figure 5 is a sectional view taken at the line 5 on Fig. 4 and viewed in the direction of the arrow.

Figure 6 is a view like Fig. 4 showing a modification of the structure of the preceding figures of the drawing.

Figure 7 is a sectional view of a modification of the stud member.

Figures 8 and 9 are views like Fig. 4 of two other modifications of the invention; and Figure 10, a section taken at the line 10 on Fig. 9 and viewed in the direction of the arrow.

Referring to the construction shown in Figs. 1 to 5, inclusive, the fastener comprises a stud-equipped member 11 and a spring-equipped member 12 for interlocking therewith, these members being shown as secured, as for example, by stitches 13 and 14, to the ends 15 and 16, respectively, of a band to be releasably connected together.

The stud-equipped member 11 which may be made of sheet metal is shown as formed of a dished convexed body portion 17 provided centrally with a stud portion 18 with its terminal portion 19 in the form of a head connected with the body portion 17 by a neck portion 20 shown as containing diametrically opposed openings 21.

The spring-equipped member 12 comprises a body portion 22 which may be made of sheet metal as shown with a face thereof convexed as represented at 23, and with an inturned annular flange 12ª at its rear side, the body portion 22 containing an opening 24 having a portion 25 to one side of its center, of a width greater than the width of the head 19 to adapt the stud 18 to enter it by movement crosswise of the plane of the member 12. The central portion 26 of the opening 24 is of reduced width as shown, it being slightly greater than the width of the neck portion 20 of the stud and less than the width of the head 19 whereby upon relatively shifting the parts of the fastener into a position in which the stud member registers with the central portion of the member 12, the head 18 becomes interlocked with the wall of the portion 26 of the opening; it being observed that the manner of assembling the stud member 11 with the member 12 simulates the manner in which a hook and eye are assembled, namely, by relative movement of these two parts in substantially parallel planes.

The member 22 along the opposite side edges of the opening 24 is provided with inturned flanges 27 slotted, as indicated at 28, to register with the slots 21 in the stud 18 when the parts are assembled as stated.

The member 22 also comprises a spring member 29 shown as formed of spring wire which is housed therein and presents at its ends diametrically opposed V-shaped portions 30 which extend through the slots 28.

When the stud member 11 is assembled with the member 12 as stated the portions 30 of the spring enter the slots 21 in the stud as shown in Figs. 3 and 4 and thus releasably secure the members 11 and 12 together in assembled position.

As will be noted from Fig. 4, the various parts as shown therein are so proportioned and arranged that the stud 18 seats against the inner end wall of the opening 24 thus causing the head 18 to lap the marginal wall of the opening 24 throughout a relatively great portion of the circumference of the head, thereby affording additional safeguard against accidental release of the parts of the fastener should the spring fail to function.

As will be understood, the parts of the fastener may be readily released by sliding them relatively to disengage the stud from the springs and move it into the wide portion 25 of the opening.

The convexing of both of the members 11 and 12 with these convex surfaces oppositely disposed is of advantage as it enables the parts to be readily assembled and disassembled. The slotted flanges 27 are also of advantage as they serve to hold the spring portions 30 in proper position for cooperation with the stud in the assembling of the parts as well as in the assembled relation of the same.

The construction shown in Fig. 6 is the same as that disclosed in the preceding figures of the drawing except that the spring member herein shown at 31 and having V-shaped portions 32 corresponding with the portions 30 of the spring 29, is of somewhat different form.

The stud-equipped member of Fig. 7 and herein represented at 33 is of the same general construction as the stud-equipped member 12, except that instead of providing slots in the neck portion of the stud to receive the ends of the spring, the neck portion, herein represented at 34, is indented at diametrically opposed portions thereof, as represented at 35, to form depressions for interlock with the spring.

The construction shown in Fig. 8 is the same as that of Figs. 1 to 5, inclusive, except that the opening to receive the head of the stud instead of being provided with a portion of reduced width as represented at 26 in Fig. 1, is of a width throughout its length slightly greater than the width of the head of the stud, resulting in the flanges 36 thereof and corresponding with the flanges 27 of Figs. 1–5, being equidistantly spaced. In this construction, as also in the case of the construction shown in Figs. 9 and 10 and hereinafter described, the stud-equipped member may be assembled with the spring-equipped member either by the operation as described above in connection with Figs. 1 to 5, inclusive, or by merely pushing the stud into the opening in the spring-equipped plate substantially at the central portion of the latter. However, the parts are so constructed and arranged as shown that in the final positioning of the stud in the spring-equipped member a portion of the head of the stud will lap the inner end wall of the opening in the spring-equipped member and thus afford added security against accidental disengagement of the parts of the fastener, should the spring means fail to function.

As will be understood, the constructions of Figs. 1–8, inclusive, each comprises two interlocks tending to prevent accidental separation of the parts of the fastener, viz., the interlock between the spring means and a shouldered portion of the stud member and the interlock between the terminal portion of the stud member and the wall of the opening in the spring-equipped member.

The construction shown in Figs. 9 and 10 is the same as that shown in Fig. 8 except that the spring-equipped member herein represented at 37 instead of engaging at its V-portions 38 with the slotted or indented portions of a stud member as in the case of the previously described constructions, merely press against the side of the stud shown in Fig. 9 at 39, at the neck portion of the latter and yieldingly force the stud against the end wall of the stud receiving opening in the spring-equipped member thereby holding the head of the stud in interlocked relation to this wall; it being understood, however, that if desired the stud receiving opening of the spring-equipped member of this construction may be shaped as in the case of the construction shown in Figs. 1 to 5, which would compel the assembling of the stud member and spring-equipped member in the manner as explained of this other construction, in which case a greater area of interlock between the head of the stud and the wall of the opening would be afforded.

While I have illustrated and described certain embodiments of my invention I do not wish to be understood as intending to limit it thereto as the same may be variously modified and altered and the invention embodied in other forms of structure without departing from the spirit thereof; and in this connection it may be stated that within certain phases of my invention the provision of the slotted flanges at the stud receiving opening in the spring-equipped member, may be omitted.

What I claim as new, and desire to secure by Letters Patent is:

1. In a fastener, the combination of a stud member formed of a body portion and a stud having an inset shoulder, said body portion being of bowed form, and a device for cooperation with said stud member comprising a body portion having an opening to receive the stud member and along which opening the stud member is movable in the plane of said second-named body portion, said second-named body portion being of bowed form, said bowed portions when said member and device are assembled being juxtaposed, and spring means on said second-named body portion, adapted to interlock with said shoulder upon shifting said stud member in said opening along the latter in the plane of said second-named body portion.

2. In a fastener, the combination of a stud member formed of a body portion and a stud having an inset shoulder, said body portion being of bowed form, and a device for cooperation with said stud member comprising a body portion having an opening to receive the stud member and along which opening the stud member is movable in the plane of said second-named body portion, said second-named body portion being of bowed form, said bowed portions when said member and device are assembled extending in opposite directions with their crests in contact, and spring means on said second-named body portion, adapted to interlock with said shoulder upon shifting said stud member in said opening along the latter in the plane of said second-named body portion.

MARY A. STREHLEIN.